UNITED STATES PATENT OFFICE.

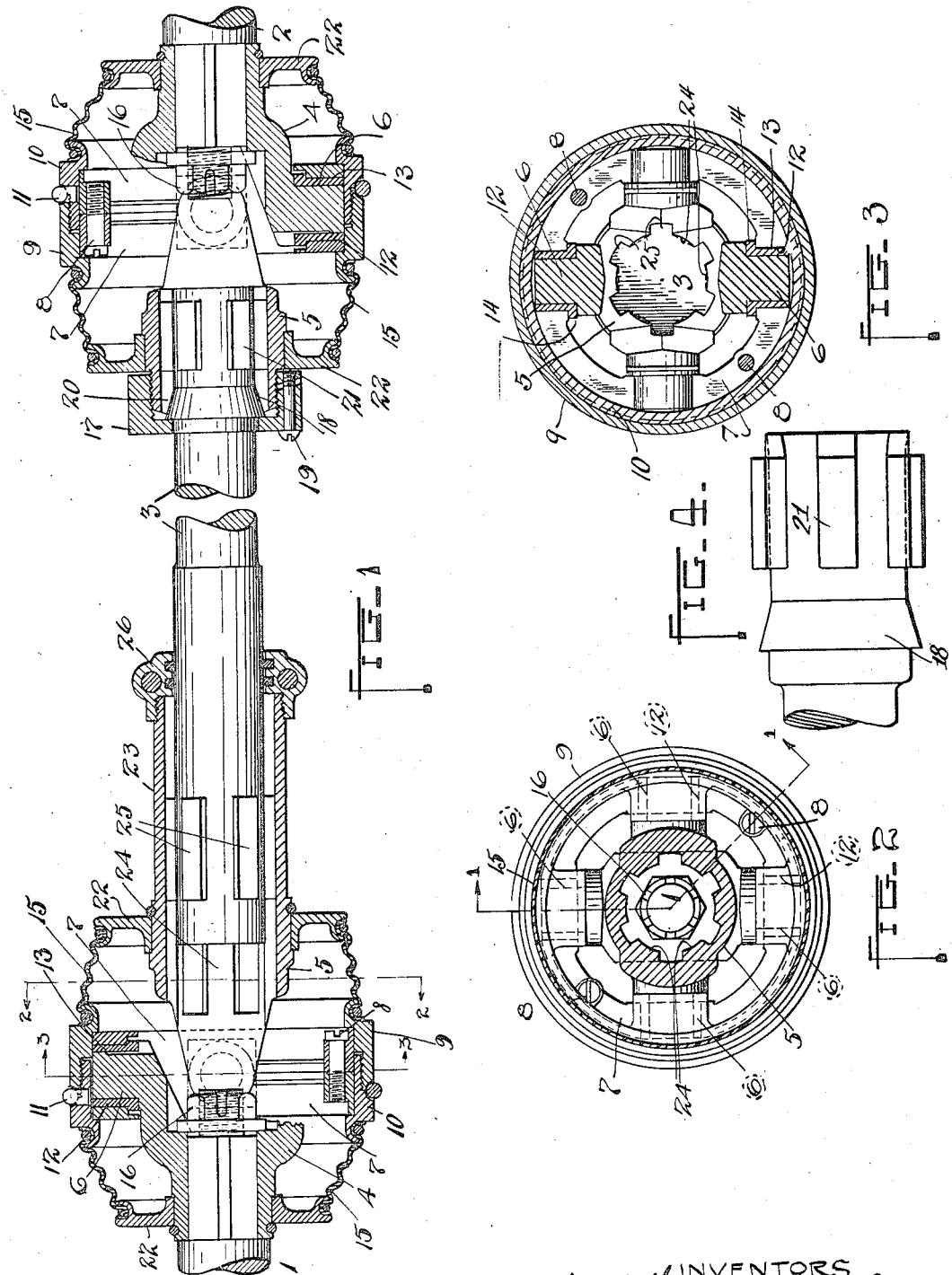

DE WITT C. COOKINGHAM AND JOHN H. HERTNER, OF CLEVELAND, OHIO, ASSIGNORS TO THE BAKER R & L COMPANY, OF CLEVELAND, OHIO, A CORPORATION OF OHIO.

SECURING DEVICE FOR UNIVERSAL-JOINT MEMBERS.

1,175,880.  Specification of Letters Patent.  Patented Mar. 14, 1916.

Application filed January 7, 1913. Serial No. 740,588.

*To all whom it may concern:*

Be it known that we, DE WITT C. COOKINGHAM and JOHN H. HERTNER, citizens of the United States, and residents of Cleveland, county of Cuyahoga, State of Ohio, have jointly invented a new and useful Improvement in Securing Devices for Universal-Joint Members, of which the following is a specification, the principle of the invention being herein explained and the best mode in which we have contemplated applying that principle, so as to distinguish it from other inventions.

The present improvements relate to the construction of universal joints such as are employed in shaft-driven motor vehicles, that is in motor vehicles in which the connection from the motor to the rear axle is through the medium of a shaft. In such construction one universal joint is usually provided at the rear end of the driving shaft, which may be either a continuation of the motor shaft, or an intermediate shaft connected with the motor through suitable gearing, while another is provided just forward of the rear axle between the connecting driving shaft and a short spindle or shaft which forms, in effect, part of the differential mechanism connecting the sections of such rear axle.

The object of the invention is to provide a universal joint that will be simple and light in construction, and yet fully capable of withstanding the severe strains to which it is apt to be subjected in a connection, such as just described; as also to provide a joint that may be readily disassembled and will permit of the separation of the connecting shaft therefrom, where a pair of such joints are used as in the case in hand, without disassembling either of the joints.

To the accomplishment of the foregoing and related objects, the invention, then consists of the means hereinafter fully described and particularly pointed out in the claims.

The annexed drawing and the following description set forth in detail certain mechanism embodying the invention, such disclosed means constituting, however, but one of the various mechanical forms in which the principle of the invention may be used.

In said annexed drawings:—Figure 1 is a central longitudinal section of two universal joints and a connecting shaft arranged for use in the fashion above referred to, the plane of section being indicated by the line 1—1 in Fig. 2; Figs. 2 and 3 are transverse sections of one of the joints taken on the lines 2—2 and 3—3, respectively, Fig. 1; and Fig. 4 is a side elevation of one end of the shaft shown in Fig. 1.

In Fig. 1 only broken sections of the driving shaft 1 and the driven shaft 2, which require to be connected, are shown, and so far as the construction of the flexible connection between these shafts is concerned, either one thereof may be considered the driving or driven shaft, as will be obvious. The connecting shaft 3, moreover, may be of any desired length and the amount of play allowed between such shaft and the particular flexible joint selected for slip connection with said shaft will vary upon the character of the service to which the connection is to be applied.

In their general features of construction, the pair of joints illustrated are very similar and may be described together. Thus each consists of two joint members 4 and 5 in the form of cross heads having oppositely extending arms 6 which are held in rectangular relationship to each other, being journaled in an annular frame. This frame is primarily made up of two similar sections in the form of plain rings 7 that are adapted to be lightly secured together by two screws 8, as shown in Fig. 1, but are more securely held together in the assembled condition of the joint by means of clamping rings, 9 and 10, the first internally and the other externally threaded, which fit over such plain rings, and together therewith form a very solid and substantial annular structure. These clamping rings are secured against relative rotation by means of a lock ring 11 fitted into a groove that is left between their opposing edges, as clearly shown in Fig. 1.

The plain rings 7, which form the basis of the structure under consideration, are provided with four equi-distantly spaced semicircular notches, that, when the rings are thus assembled, provide apertures 12 adapted to receive suitable bushings 13 in which the ends of the joint members are journaled. Such bushings are conveniently held against rotation by being provided with square heads 14, that fit into corresponding seats provided therefor upon the inner faces of said rings.

The interior of each joint is closed against entrance of dust and the like, by means of circular leather coverings 15 attached at one edge to the corresponding clamping ring and at the other to a ring 22 mounted upon the adjacent joint member, as will be readily understood.

The driving and driven shafts 1 and 2 are secured to the outwardly directed joint members 4 in the usual fashion by having their ends squared to fit into such joint members and threaded to receive retaining nuts 16 which likewise are wholly inclosed within the leather coverings of the joints.

The one end of the connecting shaft 3 (as shown, the one that is joined to the shaft 2), is detachably secured to the adjacent joint member 5 by means of a collar 17 threaded onto such member and adapted to engage a shoulder 18 on the shaft, such collar having a locking screw 19 whereby it may be retained against rotation when the parts are assembled. The one face of the shoulder on the shaft is beveled to fit the opposing bevel on the ends of a series of longitudinally extending lugs 21 formed in the inner face of the bore in the joint member, and such shaft is provided with similar longitudinally extending, but somewhat shorter lugs 21 that fit between those on the joint member so as to securely hold the shaft against rotation in the latter. It will thus be seen that this end of the connecting shaft is tightly secured to the joint member but that the shaft itself is not secured to this joint against longitudinal movement by means of the lugs 21 and hence by loosening the collar 17 the end of the shaft may be readily withdrawn upon a short endwise movement of the shaft away from the joint. To receive the other end of the shaft 3, the inner joint member 5 of the other joint is provided with a tubular extension 23, in which longitudinally extending lugs 24 are formed, as in the member last described, such lugs being engaged by corresponding lugs 25 on the shaft end fitted in said member. This tubular extension and the lugs therein are made of sufficient length not only to permit of the amount of endwise play of the shaft which may occur by reason of the relative transverse displacement of the joints, but also to permit of the shaft being withdrawn from the first described joint upon the collar being loosened as aforesaid. A dust cap 26 is threaded upon the outer end of the tubular extension of this last described joint member so as to thoroughly close its interior to the entrance of dust and water.

It is apparent from the foregoing description that the connecting shaft may be readily separated from the joints, should this become necessary, without opening up the joints, which is desirable, inasmuch as the latter are generally filled with lubricant and should not be disturbed unless it is desired to get at their interior for some special purpose. Should this become necessary, the clamping rings 9 and 10 may be readily unscrewed and removed, together with the leather coverings, so as to expose the inner plain rings 7 and the joint members 4 and 5 proper, which are journaled therein. By then simply removing the two retaining screws 8, these plain rings may be separated and the joint entirely disassembled for the replacement of the bushings, or such other purpose as may be desired. The assembling of the joint is, of course, rendered equally simple and convenient by the construction in question.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In mechanism of the character described, the combination of a shaft having a plurality of longitudinally extending lugs adjacent to one end and a beveled shoulder adjacent to the inner end of such lugs, a member provided with a tubular extension provided with longitudinally extending recesses adapted to receive such lugs on said shaft, such extension being also provided with an internal beveled portion adapted to fit such shoulder on said shaft, and a collar abutting against such shoulder and adjustably engaging such extension.

2. In mechanism of the character described, the combination of a shaft having a plurality of longitudinally extending lugs adjacent to one end and having also a shoulder adjacent to the inner end of such lugs, such shoulder being beveled on the side adjacent such lugs; a member provided with a tubular extension having longitudinally extending recesses adapted to receive such lugs on said shaft, such extension being also provided with an internal beveled portion adapted to fit against the beveled portion of such shoulder on said shaft, said extension being externally threaded; and a collar abutting against such shoulder, said collar being internally threaded to adapt it to adjustably and removably engage such threaded extension of said member.

Signed by us this 4th day of January, 1913.

DE WITT C. COOKINGHAM.
JOHN H. HERTNER.

Attested by—
D. T. DAVIES,
JNO. F. OBERLIN.